No. 879,584.
PATENTED FEB. 18, 1908.
W. M. PRESTON.
VEHICLE HUB.
APPLICATION FILED JULY 8, 1907.
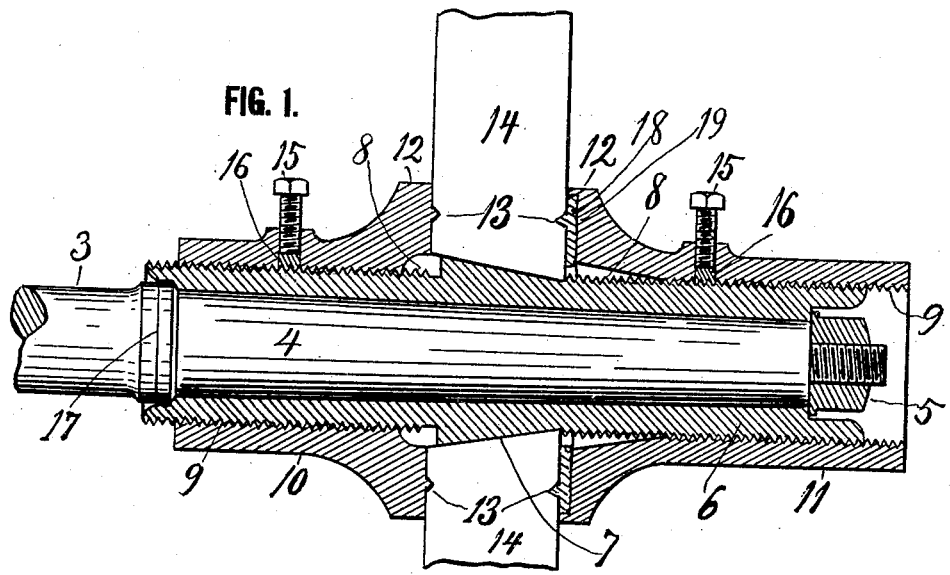
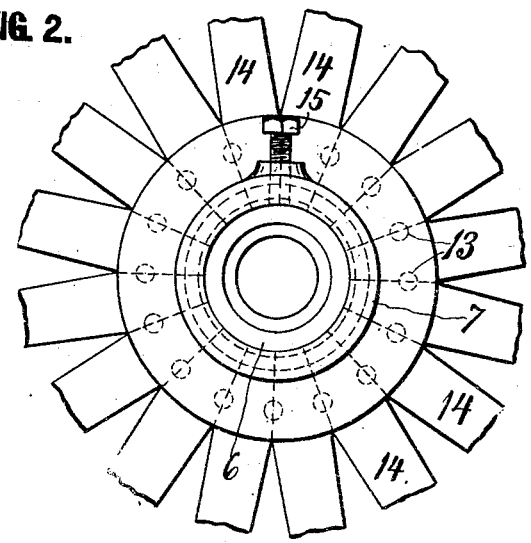
WITNESSES:
D. E. Carlsen
L. E. Carlsen
INVENTOR:
Walter M. Preston
BY his ATTORNEY:
A. M. Carlsen

UNITED STATES PATENT OFFICE.

WALTER M. PRESTON, OF SPRING VALLEY, WISCONSIN, ASSIGNOR OF ONE-HALF TO WILLIAM BAHR AND ROLAND BAHR, OF SPRING VALLEY, WISCONSIN.

VEHICLE-HUB.

No. 879,584.      Specification of Letters Patent.      Patented Feb. 18, 1908.

Application filed July 8, 1907. Serial No. 382,648.

*To all whom it may concern:*

Be it known that I, WALTER M. PRESTON, a citizen of the United States, residing at Spring Valley, in the county of Pierce and State of Wisconsin, have invented a new and useful Vehicle-Hub, of which the following is a specification.

My invention relates to improvements on wheel-hubs for vehicles; and the principal object is to provide the hubs of vehicle wheels with means whereby the spokes may be readily adjusted outward toward the felly and thereby tightened when they become loose by the shrinking of the wood in the felly. This and other objects I obtain by the novel construction and arrangement of parts illustrated in the accompanying drawing, in which,—

Figure 1 is a diametrical section of a wheel hub of my improved construction and a portion of an axle with its skein in the hub. Fig. 2 is a side elevation of the hub and adjacent ends of the spokes as if looking from right to left in Fig. 1.

Referring to the drawing by reference numerals, 3 designates a vehicle axle upon whose skein 4 is retained by a nut 5 a bushing 6 having near the middle a conical collar 7, and from said collar toward both ends it is provided with screw-threads 8 which mesh with the internal threads 9 of two hub-sections 10—11, which are formed with flanges 12 having adjacent prongs 13, which, when the spokes 14 are clamped between the flanges and butt against the collar 7, are forced in between the hub ends of the spokes as clearly shown at 13 and thereby help to tighten and hold the spokes. To permit hub-section 11 to turn on the spokes, the prongs 13 of that section are provided on a loose ring 18 in a recess 19 of the hub.

In making and using the hub, the spokes are cut to such a length that they fit tightly between the felly and the smaller portion of the collar 7, which they are beveled to fit; the hub section 10 is then adjusted against the spokes and the hub section 11 screwed against the other side of the spokes until they are all squeezed tightly between the flanges 12 and engaged by the prongs 13; the hub-sections are then secured in the adjustable positions by set-screws 15, screw-threaded in the hub-sections and engaging the bushing 6 by means of copper cushions 16, which are used to prevent the ends of the screws from spoiling the external screw-threads of the bushing. When the spokes get loose they are tightened by screwing the two hub sections toward the middle of the axle, whereby the spokes are forced upon larger and larger portions of the collar 7 and thereby tightened against the felly.

The skein 4 may be integral with the axle 3, or separable from the axle at the line 17, but as such separation has been fully set forth in another application filed by me simultaneously with this one I will not here further describe it.

The construction set forth is not only handy for taking up wear and shrinkage of the parts but also for removing old or broken spokes and substituting new ones.

Having thus described the invention, what I claim is:—

1. The combination with an axle of a bushing adapted to revolve thereon and having external screw threads and near its middle a tapering collar, wheel-spokes butting against the periphery of the collar, hub sections threaded upon the bushing and engaging opposite sides of the spokes, and prongs on one of the hub-sections for engaging the spokes, set screws in the hub sections and soft metal cushions between the ends of the set-screws and the bushing.

2. The combination with an axle of a bushing adapted to revolve thereon and having external screw threads and near its middle a tapering collar, wheel - spokes butting against the periphery of the collar, hub sections threaded upon the bushing and engaging opposite sides of the spokes, prongs on one of the hub sections for engaging the spokes, and a ring in a recess of the other hub section and provided with prongs for likewise engaging the spokes, substantially as and for the purpose set forth.

In testimony whereof I affix my signature, in presence of two witnesses.

WALTER M. PRESTON.

Witnesses:
    J. H. GRASLIE,
    O. D. SPRINGER.